United States Patent
Fernando et al.

(10) Patent No.: US 7,706,298 B2
(45) Date of Patent: Apr. 27, 2010

(54) ROUTE DEPENDENCY SELECTIVE ROUTE DOWNLOAD

(75) Inventors: Rex Fernando, San Jose, CA (US); Dheerendra Talur, Fremont, CA (US); Pradosh Kumar Mohapatra, Fremont, CA (US); Paul A. Jensen, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 579 days.

(21) Appl. No.: 11/613,804

(22) Filed: Dec. 20, 2006

(65) Prior Publication Data

US 2007/0153699 A1 Jul. 5, 2007

Related U.S. Application Data

(60) Provisional application No. 60/756,300, filed on Jan. 5, 2006.

(51) Int. Cl.
*H04L 12/56* (2006.01)

(52) U.S. Cl. .................................... 370/252; 370/401
(58) Field of Classification Search ................. 370/252, 370/392, 401
See application file for complete search history.

(56) References Cited

U.S. PATENT DOCUMENTS 7,027,396 B1 * 4/2006 Golan et al. ................ 370/232

OTHER PUBLICATIONS

Rosen, E., et al., "BGP/MPLS VPNs", *Request for Comments: 2547*, Network Working Group, (Mar. 1999), 24 pgs.

* cited by examiner

*Primary Examiner*—Melvin Marcelo
(74) *Attorney, Agent, or Firm*—Schwegman, Lundberg & Woessner, P.A.

(57) ABSTRACT

A method of selecting routing tables to include in a network line card consists of determining dependencies of local routes on remote routes using a reference count on prefixes, and selectively downloading remote routes when resolution of a route has a dependency on a remote route. In one embodiment, only remote routes that are needed to forward traffic are downloaded to a network line card.

20 Claims, 4 Drawing Sheets

ROUTE DEPENDENCY SELECTIVE ROUTE DOWNLOAD

RELATED APPLICATIONS

This patent application claims the benefit of priority, under 35 U.S.C. Section 119(e), to U.S. Provisional Patent Application Ser. No. 60/756,300, filed on Jan. 5, 2006, the entire content of which is incorporated herein by reference.

BACKGROUND

Companies need networks to communicate both internally and externally. For internal communications, some companies create infrastructure, such as optical cables for transmitting electronic communications. Such infrastructure may also be leased on an exclusive basis from telecom companies, or may be shared with other companies. Still further, telecom companies can provide a virtual private network (VPN), essentially transmitting packets of voice and data via public infrastructure. A VPN may be thought of as a private communications network usually used within a company, or by several different companies or organizations, to communicate over a public network. VPN message traffic is carried on public networking infrastructure (e.g. the Internet) using standard (often insecure) protocols, or over a service provider's network providing VPN service guarded by well defined Service Level Agreement (SLA) between the VPN customer and the VPN service provider.

Companies can interface to the public network via provider edge (PE) line cards and customer edge (CE) line cards. A PE line card is part of a router between one network service provider's area and areas administered by other network providers. A CE line card is part of a router that is owned by a customer and provides routing of traffic within a customer.

Many companies may interface to a PE router via CE routers. The PE has a customer side, and a core facing side, where the core is the public network. Core facing line cards each have an internet routing table that currently consists of about 150,000 routes. This consumes a significant amount of memory, and increases the cost of such line cards. Each customer may also have their own private routing tables. Such routing tables may have about 5,000 routes apiece. Including all the private routing tables, as well as the internet routing table would consume even more resources of line cards, and hence significantly increase the cost of such line cards, which are already expensive.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Routing is a means of selecting paths in a computer network along which information should be sent. Routing directs forwarding, the passing of logically addressed packets from their source toward their ultimate destination through intermediary nodes, called routers. Forwarding is usually directed by routing tables within the routers, which maintain a record of the best routes to various network destination locations. The construction of routing tables is important to efficient routing.

Routing tables are used in computer networks to direct forwarding by matching destination addresses to the network paths used to reach them. The construction of routing tables is the primary goal of routing protocols. In the simplest model, hop-by-hop routing, each routing table lists, for all reachable destinations, the address of the next device along the path to that destination; the next hop. Assuming that the routing tables are consistent, the simple algorithm of relaying packets to their destination's next hop thus suffices to deliver data anywhere in a network. In practice, hop-by-hop routing is being increasingly abandoned in favor of layered architectures such as MPLS, where a single routing table entry can effectively select the next several hops, resulting in reduced table lookups and improved performance. The need to record routes to large numbers of devices using limited storage space represents a major challenge in routing table construction. The present application describes a new way to selectively download routes that are needed for forwarding.

Figure 1A:
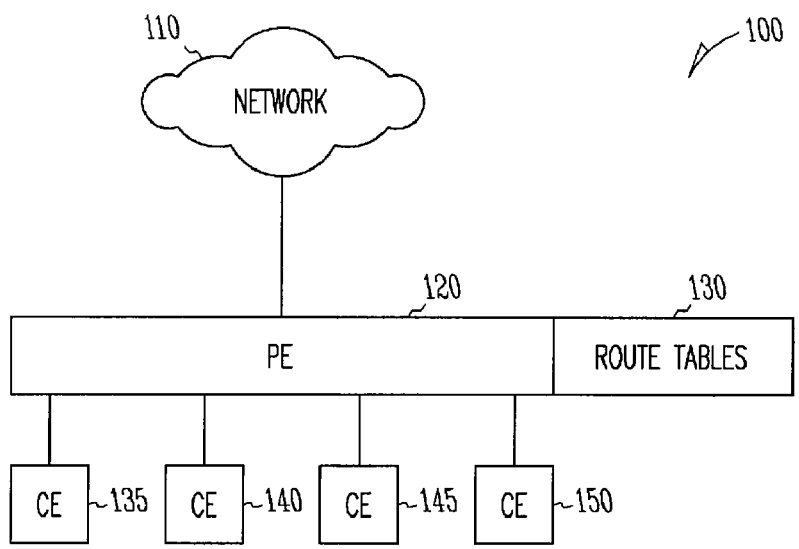
FIG. 1A is a block diagram of a network according to an example embodiment.

A number of virtual private networks (VPNs) is shown in FIG. 1A generally at 100. A public network 110, such as the Internet consists of switches, optical fibers, cables, satellites and other equipment used for communicating information. Telecommunications companies provide provider edge (PE) routers that may include one or more provider edge cards, such as provider edge card 120 that is coupled to this public network. A side of the card having one or more connections to the public network is referred to as a core facing edge of the card. PE cards have a large number of route tables 130, referred to as routing information base (RIB) tables and forwarding information base (FIB) tables.

PE cards may have a main processor and a route processor in one embodiment. Routes may be downloaded from the route processor RIB tables to the FIB tables for use in forwarding messages.

Information to be transmitted may identify its destination with an address, such as an Internet Protocol (IP) address. The PE card may then use the address to look up a route. Routes stored at each PE card include a global internet routing table, currently having about 150,000 routes, referred to as a default table.

Network 100 also consists of one or more customer edge (CE) cards shown at 135, 140, 145, 150, and 155. The CE cards couple to the PE card via a customer facing side of the card. The CE cards contain route tables for local routes, such as customer routes for a customer owned network. Since each customer has their own set of customer routes, it would be very expensive for each PE card to also store all of the customer routes, including remote routes.

Figure 1B:
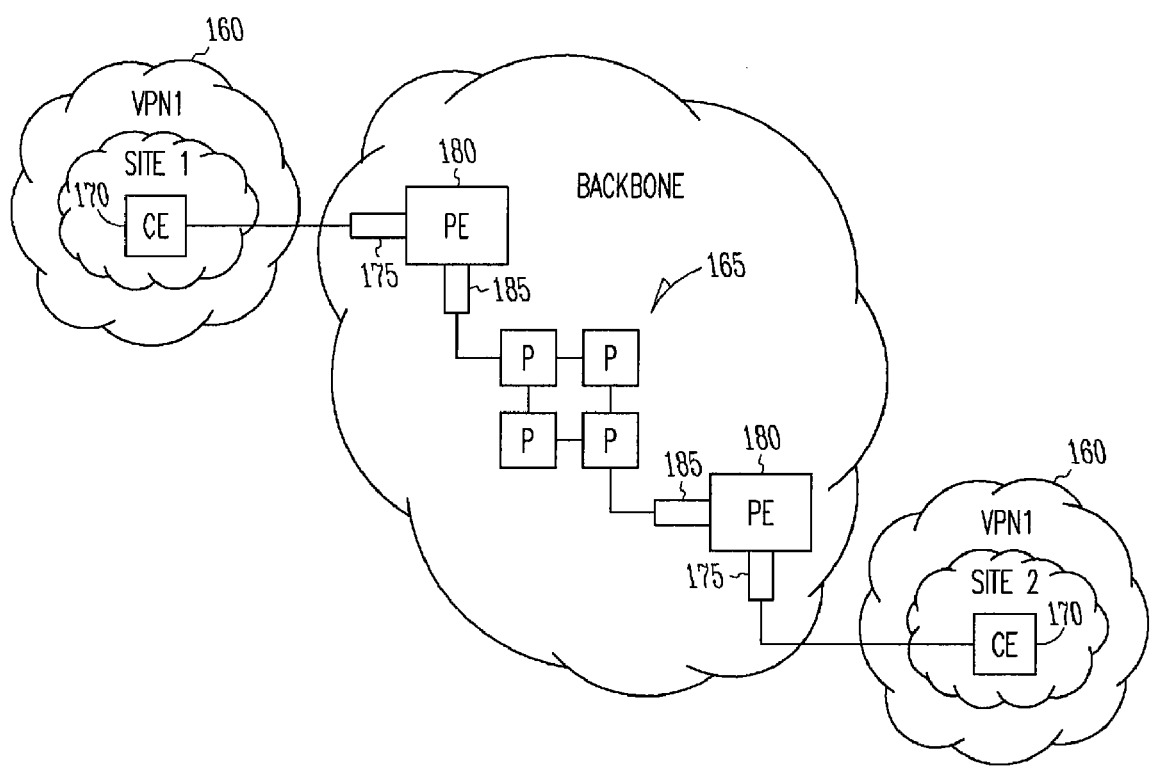
FIG. 1B is a block diagram of an alternative network according to an example embodiment.

FIG. 1B illustrates a virtual private network (VPN) 160 coupled via a provider backbone routers 165, such as the Internet, or other network as desired. As illustrated, two sites of the same VPN 160 have CE routers 170 that couple to provider edge line cards 175 on provider edge routers 180. The provider edge routers 180 also have core facing line cards 185 that couple to the backbone network routers 165. In one embodiment, the core facing line cards and provider edge line cards of the provider edge router may be the same card with different physical connectors, or separate cards. The cards may each have multiple provider edge and/or core facing connectors in various embodiments. It should be noted that this is just one embodiment that illustrates connecting remote sites of a virtual private network. Further embodiments may couple different virtual private networks or other types of networks as desired.

Sometimes, a message received at the PE card must be routed to a CE dependent on a local route, which is obtained from the CE. This may occur when a customer may have purchased network bandwidth that it would prefer to use as opposed to public network assets. A message intended for a city in another country may be sent via the public network, or via a private link, which the customer has paid for and would like to use if possible. There may also be shorter routes available by sending to one CE versus another CE. To identify the proper local route, the PE card may need to have access to a remote route, which may be learned from another PE card. If the remote route is not downloaded to the PE core facing line card, FIB's route resolution would fail and as a result traffic which comes to the router would be dropped. In the present invention, such route dependencies are detected efficiently, and corresponding remote routes are downloaded.

In one embodiment, a function referred to as "longest_match(P)" returns the longest matching prefix or route in the routing table, and is used to help identify remote routes for downloading. Consider the following prefix or route dependency:

(P1, P2, P3)→N1
   P4→N2
   P5→N3
   P6→I1, where longest_match(N1)=P4 longest_match(N2)=P5 longest_match(N3)=P6

P1, P2, and P3 are routes that are dependent on other routes in the routing table. P6 points to a next-hop which is not dependent on any other route in the RIB (this could be an immediate next-hop or in the case of some types of PE cards, a transport tunnel).

Figure 2:
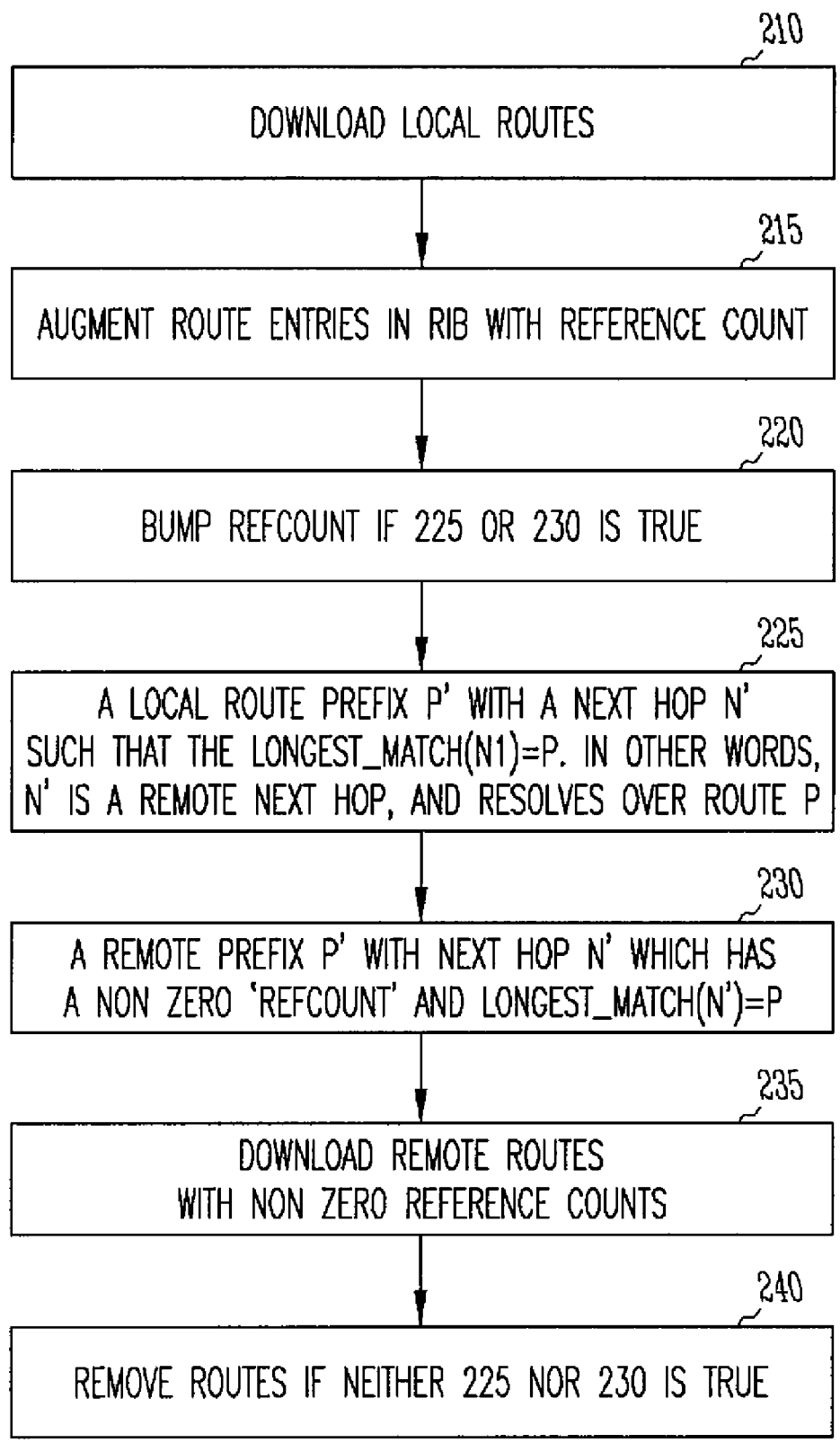
FIG. 2 is a flow chart illustrating a method of detecting remote routes to download to a core facing card according to an example embodiment.
Figure 3:
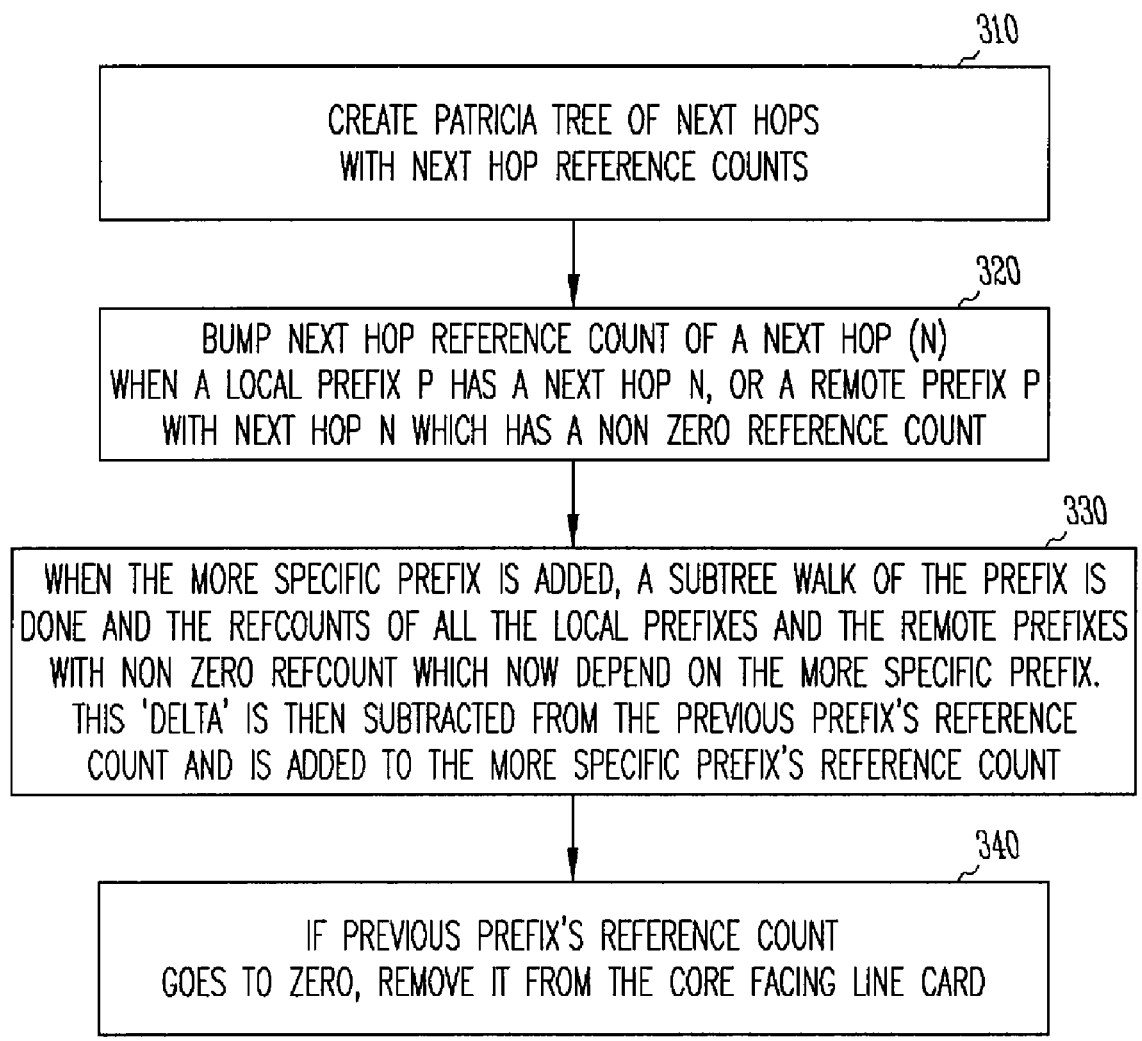
FIG. 3 is a flow chart illustrating a further method of detecting remote routes to download to a core facing card according to an example embodiment.

If P1 and P2 are local routes, these routes are downloaded at 210 in FIG. 2, to the core facing line card. However, if the rest of the routes are remote routes, they would not be downloaded to the core facing line card and as a result the FIB recursion would fail. P4, P5 and P6 are detected as needed, and are downloaded to the core facing line card so that route resolution can succeed.

For detecting the dependencies, every route entry in the RIB is augmented with a reference count variable at 215, which may be referred to as "refcount" for brevity. The refcount for each route entry is bumped up at 220 if at least one of the following conditions, A at 225 or B at 230 holds:

A. A local route prefix P' with a nexthop N' such that the longest_match(N1)=P. In other words, N' is a remote next hop, and resolves over route P.

B. A remote prefix P' with nexthop N' which has a non zero 'refcount' and longest_match(N')=P.

It is easy to detect these dependencies at the time of route addition. If as a result of a route add, the 'refcount' of another route becomes non zero, then even if the route is a remote route, it is downloaded to the core facing line card at 235. The reverse operation is performed during a route delete operation.

Hence, a route is downloaded to the core facing line card if either a route is marked local, or a route is marked remote with a non zero 'refcount'. A route is removed at 240 if both the above conditions is tested FALSE.

In a further embodiment, the following situation is considered.

P1→N1

P2→N2

P3→N3 longest_match(N1)=P3 longest_match(N2)=P3

If P1 and P2 are local and P3 is remote, P3's 'refcount' is bumped due to P2 and P2, and P3 also gets downloaded to the core facing line card. Now, if there is a more specific of P3 that appears in the routing table (P4→N4) such that the following equation holds:

longest_match(N1)=P4. This requires that part of P3's refcount be transferred to P4. In order to achieve this, a second data structure may be used. This separate data structure is a Patricia tree (a data structure used to store a set of strings) of all next hops, which is created at 310. These next-hops also have a reference count, referred to as 'nh-refcount'. A next hop (N) in this second data structure has its nh-refcount bumped when a local prefix P has a next-hop N, or a remote prefix P with next-hop N which has a non zero 'refcount' AT 320. These nh-refcounts may be computed at the time of route addition and deletion.

When the more specific (P4) is added, a subtree walk of P4 is done on this nexthop table and the refcounts of all the local prefixes and the remote prefixes with non zero refcount which now depend on P4. This 'delta' is then subtracted from P3's refcount and is added to P4's refcount at 330. The fact that a next-hop depends on P4 can be simply deduced by performing a lookup of the next-hop on the RIB table. If the lookup returns P4, then it is known that the next-hop is now dependent on the P4. In this process, P3's refcount might go to '0' in which case it can be removed from the core facing line card at 340.

A corollary of the above additional case is when a prefix P with non zero refcount is deleted. The count may be moved to P's parent node. Note that the space complexity of this extra data structure is the number of next-hops (few in number) and the complexity of this extra operation is O(M*W), where M is the number of next-hops in the subtree walk and W is the keylength of the RIB table.

In further embodiments, other ways of calculating whether a remote route should be downloaded include the use a simple tag, or even index the dependencies without keeping an explicit reference count. For example, a method of updating a network routing table may consist of downloading local routes to the routing table of the core facing line card, augmenting route entries in the routing table with a tag, tagging routes if either a local route has a next hop that is tagged or a remote that is tagged has a next hop that is remote. Remote routes that are tagged are then downloaded. In yet a further embodiment, local routes may first be downloaded to the routing table of the core facing line card. A set of remote routes required to resolve local routes may then be computed. This computed set of dependent remote routes may then be downloaded.

Figure 4:
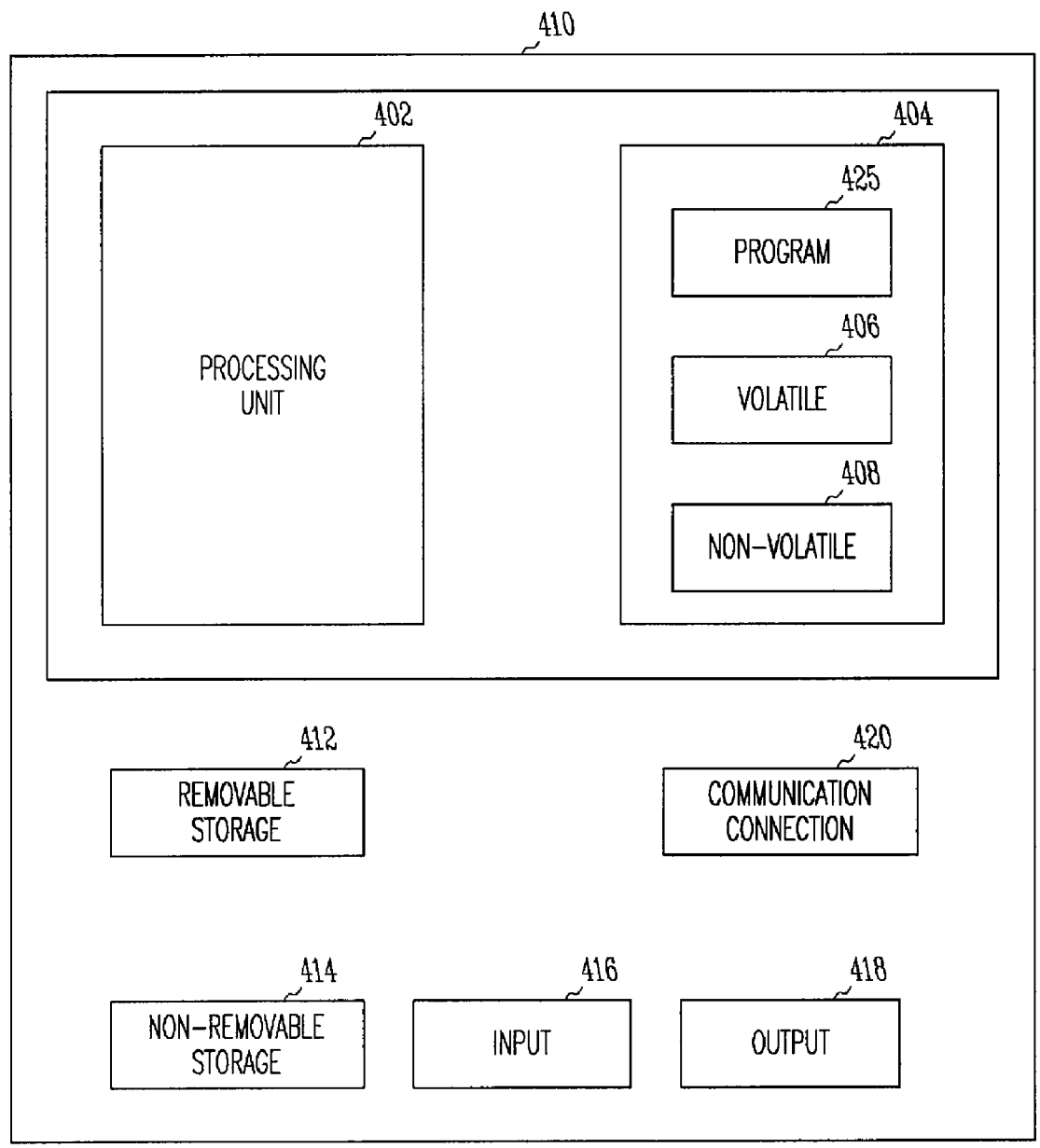
FIG. 4 is a block diagram of a typical computer system for performing one or more of the methods according to an example embodiment.

A block diagram of a computer system that executes programming for performing the above algorithm is shown in FIG. 4. A general computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium. For example, a computer program 425 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 410 to provide generic access controls in a COM based computer network system having multiple users and servers.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method comprising:
   determining dependencies of local routes on remote routes using a reference count on prefixes; and
   selectively downloading remote routes when resolution of a route has a dependency on a remote route.

2. The method of claim 1 wherein routes having a non-zero reference count are downloaded.

3. The method of claim 2 and further comprising incrementing the reference count for a prefix if a next hop for a prefix is a remote next hop.

4. The method of claim 2 and further comprising incrementing the reference count as a function of a longest matching prefix.

5. The method of claim 1 wherein the method is implemented in a core facing line card.

6. The method of claim 1 and further comprising removing a route if the reference count is zero.

7. The method of claim 1 and further comprising incrementing a next hop reference count.

8. The method of claim 7 and further comprising creating a Patricia tree of routes.

9. The method of claim 8 wherein reference counts are modified as a result of traversal of the Patricia tree.

10. A provider edge card comprising:
    means for determining dependencies of local routes on remote routes using a reference count on prefixes; and
    means for selectively downloading remote routes when resolution of a route has a dependency on a remote route.

11. A computer readable medium having instructions for causing a computer to implement a method of updating a network routing table for a core facing line card, the method comprising:
    downloading local routes to the routing table of the core facing line card;
    augmenting route entries in the routing table with a reference count;
    increasing the reference count for routes if either:
        a local route has a next hop that is remote; or
        a remote route has a non-zero reference count and longest match; and
    downloading remote routes with non-zero reference counts.

12. The computer readable medium of claim 11 wherein the method is implemented in a core facing line card.

13. The computer readable medium of claim 11 wherein the method further comprises removing a route if the reference count is zero.

14. The computer readable medium of claim 11 wherein the method further comprises:
    creating a Patricia tree of next hops with next hop reference counts;
    incrementing a next hop reference count when a local route has a next hop N or a remote route with next hop which has a non zero reference count; and
    modifying reference counts as a function of a subtree walk of a route.

15. A network line card comprising:
    a hardware module that determines dependencies of local routes on remote routes using a reference count on prefixes; and
    a hardware module that selectively downloads remote routes when resolution of a route has a dependency on a remote route.

16. The network line card of claim 15 and further comprising a memory for storing routes.

17. The network line card of claim 16 wherein routes having a non-zero reference count are downloaded into the line card memory.

18. The network line card of claim 17 and further comprising a module that increments the reference count for a prefix if a next hop for a prefix is a remote next hop.

19. The network line card of claim 17 and further comprising a module that increments the reference count as a function of a longest matching prefix.

20. The network line card of claim 15 wherein the line card is a core facing line card.

* * * * *